UNITED STATES PATENT OFFICE.

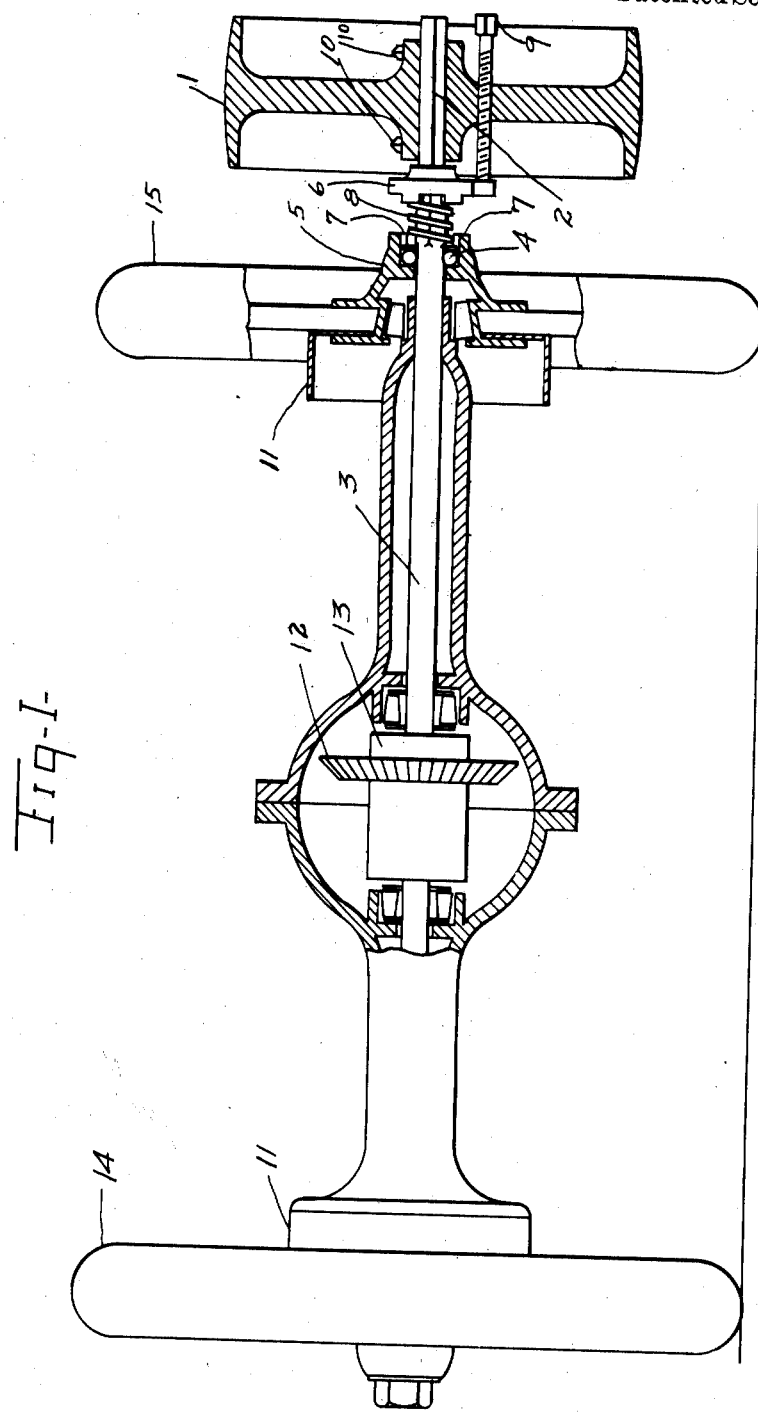

LEWIS D. STURM, OF PORTLAND, OREGON.

REAR-AXLE PULLEY-DRIVE FOR AUTOMOBILE VEHICLES.

1,390,656.   Specification of Letters Patent.   Patented Sept. 13, 1921.

Application filed March 8, 1920. Serial No. 364,279.

*To all whom it may concern:*

Be it known that I, LEWIS D. STURM, a citizen of the United States, residing at Portland, in the county of Multnomah and the State of Oregon, have invented certain new and useful Improvements in Rear-Axle Pulley-Drives for Automotive Vehicles, of which the following is a specification, reference being had to the accompanying drawing.

My invention relates to automotive vehicles, and the objects of my invention are to provide a simple and efficient device whereby power generated by the motor of an automotive vehicle may be used for purposes other than propelling said vehicle, without in any way rendering the vehicle less useful or efficient when used as originally intended.

I attain these objects by means of the mechanism illustrated in the accompanying drawing, which is a plan view, partly in section, of the completely assembled device.

The pulley 1 is mounted on one side on the squared projecting end 2 of the shaft or axle 3 which replaces the regular axle furnished with the vehicle.

The ball or roller bearing 4 is placed inside the projecting hub 5 to support the overhanging end of the shaft or axle 2 and the pulley 1.

The clutch member 6 is free to move laterally on the squared portion of the axle or shaft 3 but is compelled to revolve therewith by the squared shaft fitting a square hole in said clutch member. The clutch member 6 is held out of engagement with the jaws 7 on the hub 5 by the spring 8.

The inner end of the set screw 9 is in contact with the back face of the clutch member 6 and the pulley 1 is held in place by the short set screws 10 10.

The operation of the device is as follows:

It will be understood that the brakes on the brake drums 11 11 are set tight enough to lock the wheels securely, and that the motor of the vehicle is in operation and that the power is transmitted through the drive shaft to the ring gear 12, a differential gear of any type being in the case 13, the construction of the differential gear being so well known as to require no explanation.

The wheels 14 and 15 being locked by the brakes on the drums 11 11 and the differential gear 13 being in operation power will be transmitted through the differential to the axle 3 revolving the pulley 1. This action will take place without moving the vehicle as the clutch 6 is held out of engagement with the clutch member 7 on the hub 5 by the spring 8.

When it is desired to move the vehicle or resume use as a vehicle, the set screw 9 is screwed down carrying the clutch member 6 into engagement with the corresponding member 7 on the hub 5 and thus connecting the wheel 15 to the axle 3. In this position the power of the motor is transmitted to the wheels and the vehicle may be moved in the usual manner, the pulley 1 continuing to revolve with the axle 3.

It is understood, within the scope of what is claimed, that changes may be made in the precise embodiment of my invention, without departing from the spirit thereof.

Having thus fully described my invention, I claim, and desire to protect by Letters Patent.

1. In an automotive vehicle, the combination of an extended rear axle, a pulley at the end of the axle, a clutch member slidably mounted on the axle between pulley and rear wheel, and a propelling screw in an arm of the pulley, said propelling screw being operable from the outside of the pulley to press said clutch member against the hub of the rear wheel.

2. In an automotive vehicle, the combination of an extended rear axle, a pulley at the end of the axle, a rear wheel having an annular chamber formed by the projecting hub of the wheel, a ball bearing in the chamber, a clutch member slidably mounted on the axle between the pulley and the rear wheel, and a compression spring between the clutch member and the rear wheel, one end of said compression spring resting on the ball bearing in the chamber.

3. In combination with the rear wheel of an automobile, of a rear axle mounted for rotation within the wheel, a pulley at the end of the axle, and a clutch member slidably secured on the axle between pulley and rear wheel, said clutch member being pressed forward by a propelling screw mounted in the pulley and returned by a compression spring between clutch member and rear wheel.

Signed by me at Portland, Oregon, this 1st day of March, 1920.

LEWIS D. STURM.